United States Patent
Wight et al.

[11] Patent Number: 5,969,114
[45] Date of Patent: Oct. 19, 1999

[54] AZO COMPOUND

[75] Inventors: Paul Wight, Manchester; Peter Gregory, Bolton; Ronald Wynford Kenyon, Dorset, all of United Kingdom

[73] Assignee: Zeneca Limited, London, United Kingdom

[21] Appl. No.: 09/142,496

[22] PCT Filed: Feb. 21, 1997

[86] PCT No.: PCT/GB97/00483

§ 371 Date: Nov. 3, 1998

§ 102(e) Date: Nov. 3, 1998

[87] PCT Pub. No.: WO97/32932

PCT Pub. Date: Sep. 12, 1997

[30] Foreign Application Priority Data

Mar. 8, 1996 [GB] United Kingdom .................. 9604900

[51] Int. Cl.⁶ .................. C09B 31/08; C09B 62/513; C09B 67/22; C09D 11/00
[52] U.S. Cl. .................. 534/642; 534/797; 534/834; 8/543; 8/641; 106/31.47; 106/31.49; 106/31.52
[58] Field of Search .................. 534/642, 797, 534/834; 8/641, 543; 106/31.47, 31.49, 31.52

[56] References Cited

U.S. PATENT DOCUMENTS 3,951,591  4/1976  Birke et al. .................. 534/641 X
5,102,459  4/1992  Ritter et al. .................. 534/642 X

FOREIGN PATENT DOCUMENTS 693537   1/1996  European Pat. Off. .
95 17471 6/1995  WIPO .
95 17472 6/1995  WIPO .
97/32931 9/1997  WIPO .

OTHER PUBLICATIONS

Beech, W.F., Fibre–Reactive Dyes, Logos Press Limited, London, Great Britain, 1970, 220–221.
Venkataraman, K., The Chemistry of Synthetic Dyes, Academic Press, New York, 1972, vol. VI, 43–49.

Primary Examiner—Fiona T. Powers
Attorney, Agent, or Firm—Pillsbury Madison & Sutro, LLP

[57] ABSTRACT

A compound of Formula (1) or a salt thereof:

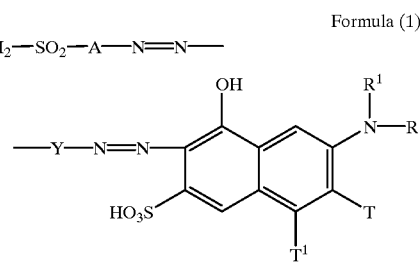

Formula (1)

wherein:

J is $-OR^4$ or $-NR^4R^5$;

$R^4$ is H or optionally substituted alkyl, aryl or acyl; and $R^4$ and $R^5$ taken together with the N atom to which they are attached form a 5- or 6-membered carbocyclic group optionally containing a ring oxygen atom;

A is optionally substituted phenylene or optionally substituted naphthylene;

Y is a substituted or unsubstituted naphthylene or phenylene ring;

$R^1$ is H or optionally substituted alkyl, alkylcarbonyl, alkylsulphonyl, alkoxycarbonyl, alkoxysulphonyl, arylcarbonyl or arylsulphonyl;

T and $T^1$ each independently is H or $SO_3H$; and

R is, for example, H or optionally substituted alkyl or aryl. The compounds are used as black colorants for ink jet printing inks.

10 Claims, No Drawings

AZO COMPOUND

This invention relates to coloured bisazo compounds and aqueous solutions thereof suitable for use in the coloration of substrates, especially sheet materials such as paper, and especially by ink jet printing.

According to the present invention there is provided a compound of Formula (1) and salts thereof:

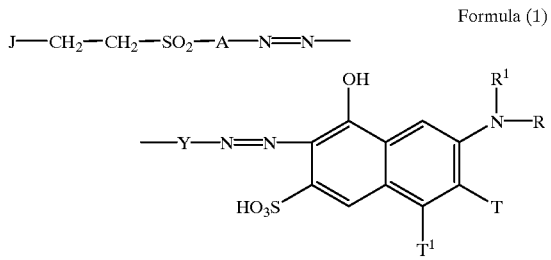

Formula (1)

wherein:
J is —$OR^4$ or —$NR^4R^5$;
$R^4$ is H or optionally substituted alkyl, aryl or acyl; and
$R^5$ is H or optionally substituted alkyl; or
$R^4$ & $R^5$ taken together with the N atom to which they are attached form a 5- or 6-membered carbocyclic group optionally containing a ring oxygen atom;
A is optionally substituted phenylene or optionally substituted naphthylene;
Y is naphthylene of Formula (1a) or phenylene of Formula (1b)

Formula (1a)

Formula (1b)

wherein
$R^2$ & $R^3$ each independently is H, —COOH or —$SO_3H$;
$Z^1$ & $Z^5$ each independently is H, optionally substituted alkyl, optionally
substituted alkoxy or —$NZ^3Z^4$;
$Z^2$ is H, halo, —COOH, $SO_3H$, optionally substituted alkyl, optionally substituted
alkoxy, or optionally substituted alkylthio;
$Z^3$ is H or optionally substituted alkyl; and
$Z^4$ is H, optionally substituted alkyl or acyl.
$R^1$ is H or optionally substituted alkyl, alkylcarbonyl, alkylsulphonyl, alkoxycarbonyl, alkoxysulphonyl, arylcarbonyl or arylsulphonyl;

T & $T^1$ each independently is H or —$SO_3H$;
R is H or optionally substituted alkyl or aryl, or a group —B—$NQ^1Q^2$;
B is optionally substituted $C_{2-6}$-alkylene; and
$Q^1$ & $Q^2$ each independently is H, optionally substituted $C_{1-4}$-alkyl or $Q^1$ and $Q^2$ together with the N atom to which they are attached form an optionally substituted 5- or 6-membered carbocyclic group optionally containing a ring oxygen atom.

When A is phenylene it is preferably phen-1,3-ylene or phen-1,4-ylene and when A is naphthylene it is preferably naphth-1,4-ylene or naphth-1,5-ylene.

When A is substituted it preferably carries from one to three, especially one or two substituents, preferably in the 2-, 3-, 4-, 2,4-, 3,4-, 2,5- or 3,5- positions when A is phenylene or in the 4-, 5-, 6-, 7-, 8-, 4,5-, 4,8-, 5,8-, or 6,7- positions when A is naphthalene. Substituents on A are preferably selected from:

COOH; —$SO_3H$; —OH; —CN; —$NO_2$; —$PO(OH)_2$; —$B(OH)_2$;
halo, preferably —Cl;
alkyl, preferably $C_{1-4}$-alkyl and especially methyl;
alkoxy, preferably $C_{1-4}$-alkoxy and especially methoxy;
—$SO_2R^7$, —$COOR^7$, —$SO_2R^7$ or —$COR^7$, wherein $R^7$ is optionally substituted $C_{1-4}$-alkyl or optionally substituted aryl, especially phenyl; and
acylamino, especially alkyl- or aryl-carbonylamino or alkyl- or aryl-sulphonylamino, and more especially $C_{1-4}$-alkyl-CONH— or $C_{1-4}$-alkyl-$SO_2NH$—.

It is preferred that A is unsubstituted phen-1,4-ylene or naphth-1,4-ylene, or that it carries one or two substituents, more especially one, selected from —COOH, —$SO_3H$, methyl, methoxy and chloro. Examples of preferred and especially preferred optionally substituted phenylene and naphthylene groups represented by A are phen-1,4-ylene, phen-1,3-ylene, 2-methylphen-1,4-ylene, 2-methoxyphen-1,4-ylene, 3-methyl-phen-1,4-ylene, 2-sulphophen-1,4-ylene, naphth-1,4-ylene and naphth-1,5-ylene.

In the naphthylene group of Formula (1a) it is preferred that one of $R^2$ and $R^3$ is H and the other is H, —COOH or —$SO_3H$. Where one of $R^2$ and $R^3$ is —COOH or —$SO_3H$ and the other is H, it is convenient to employ a mixture of isomeric compounds in one of which $R^3$ is H and $R^2$ is —COOH or —$SO_3H$ and in the other $R^2$ is H and $R^3$ is —COOH or —$SO_3H$. It is preferred that $Z^2$ is H, methyl, methoxy, —$SO_3H$, —OH and more especially H.

In the phenylene group of Formula (1b) wherein $Z^1$ is —$NZ^3Z^4$ it is preferred that $Z^3$ is H or $C_{1-4}$-alkyl, such as methyl or ethyl. It is especially preferred that $Z^3$ is H. Where $Z^4$ is alkyl this is preferably $C_{1-4}$-alkyl. Where $R^4$ or $Z^4$ is acyl this is preferably $NH_2CO$—, $R^7CO$— or $R^7SO_2$—, wherein $R^7$ is as hereinbefore defined. Where $Z^4$ is other than H, and especially where it is acyl, $Z^3$ is preferably H. It is especially preferred that —$NZ^3Z^4$ is —$NH_2$.

In the phenylene group of Formula (1b) wherein is $Z^1$ optionally substituted alkyl or optionally substituted alkoxy, it is preferred that $Z^1$ is $C_{1-4}$-alkyl such as methyl or ethyl or $C_{1-4}$-alkoxy such as methoxy or ethoxy and it is especially preferred that $Z^1$ is H, methyl or methoxy.

In the phenylene group of Formula (1b) it is preferred that $Z^2$ is $C_{1-4}$-alkyl, $C_{1-4}$-alkoxy, $C_{1-4}$-alkylthio, —Cl, —H, —COOH or —SO$_3$H, more preferably C$_{1-4}$-alkyl, such as methyl or ethyl, or C$_{1-4}$-alkoxy, such as methoxy or ethoxy and it is especially preferred that Z$^2$ is H, methyl or methoxy.

The C$_{2-6}$-alkylene group represented by B is preferably a C$_2$- or C$_3$-alkylene group optionally substituted by a group listed below as an optional substituent for R. It is especially preferred that B is —CH$_2$CH$_2$—, —CH$_2$CH$_2$(CH$_3$)—, —CH$_2$CH$_2$CH$_2$—. It is preferred that T and T$^1$ is H.

Where R is alkyl this is preferably C$_{1-4}$-alkyl and where R is aryl this is preferably phenyl. Where the group represented by R is optionally substituted the optional substituents may be selected from C$_{1-4}$-alkyl or —COOH. Examples of atoms and groups represented by R are H, methyl, carboxymethyl, ethyl, carboxyethyl, phenyl, 3-carboxyphenyl, 4-carboxyphenyl, 2,4-dicarboxyphenyl and 3,5-dicarboxyphenyl.

It is preferred that R$^1$ is H, C$_{1-4}$-alkyl, C$_{1-4}$-alkyl-carbonyl or sulphonyl, C$_{1-4}$-alkoxy-carbonyl or sulphonyl or arylcarbonyl or sulphonyl, especially phenylcarbonyl. Examples of such groups are methyl, ethyl, acetyl, methylsulphonyl, methoxycarbonyl, ethoxycarbonyl, methoxysulphonyl and benzoyl. It is especially preferred that R$^1$ is H or C$_{1-4}$-alkyl and more especially preferred that R$^1$ is H. It is preferred that R$^4$ and R$^5$ each independently is H, C$_{1-4}$-alkyl optionally substituted by —OH, —N(C$_{1-4}$-alkyl), —NH$_2$ or —NH(C$_{1-4}$-alkyl).

When R, R$^1$, R$^4$, R$^5$, R$^7$, Q$^1$, Q$^2$, Z$^1$, Z$^2$, Z$^3$ or Z$^4$ is or includes optionally substituted alkyl, this is preferably C$_{1-4}$-alkyl, such as methyl, ethyl, propyl or butyl, optionally substituted by C$_{1-4}$-alkoxy, halo, especially chloro, —OH, —COOR$^8$ or —SO$_2$OR$^8$ in which R$^8$ is H, C$_{1-4}$-alkyl or phenyl. When R, R$^4$ or R$^7$ is or includes optionally substituted aryl this is preferably phenyl, optionally substituted, preferably in the 2-, 3-, 4-, 2,4-, 3,4- or 3,5-positions, by a group or groups selected from C$_{1-4}$-alkyl, C$_{1-4}$-alkoxy, -halo, —OH, —NH$_2$, —CN, —NO$_2$, —COOR$^8$ and —SO$_2$OR$^8$.

When R$^4$ and R$^5$ or Q$^1$ and Q$^2$, taken together with the N atom to which they are attached, form an optionally substituted 5- or 6-membered carbocyclic group optionally containing a oxygen atom this is preferably a ring other than a pyrazolinyl ring, more preferably the carboxyclic group is a morpholinyl, pyrrolidinyl or piperidinyl group optionally substituted on a ring carbon atom by one or more groups, for example carboxy or any of those mentioned above for R$^5$. Preferably J is not a pyrazolinyl group.

In a preferred compound of Formula (1),

J is R$^4$O—, R$^4$R$^5$N—, morpholinyl, pyrrolidinyl or piperidinyl;

R$^4$ is H, C$_{1-4}$-alkyl, C$_{1-4}$-hydroxyalkyl or phenyl;

R$^5$ is H, C$_{1-4}$-alkyl or C$_{1-4}$-hydroxyalkyl;

A is phen-1,4-ylene or phen-1,3-ylene;

Y is of Formula (1a) in which R$^3$ is H and R$^2$ is H or —SO$_2$OH; or

Y is of Formula (1b) in which Z$^1$ is C$_{1-4}$-alkyl, C$_{1-4}$-alkoxy or —NH$_2$ and Z$^2$ is H, C$_{1-4}$-alkyl or C$_{1-4}$-alkoxy;

R is H, C$_{1-4}$-alkyl, phenyl, carboxyphenyl, dicarboxyphenyl or —B—NQ$^1$Q$^2$ in which B is —CH$_2$CH$_2$—, —CH$_2$CH$_2$(CH$_3$)—, or —CH$_2$CH$_2$CH$_2$— and Q$^1$ and Q$^2$ are each independently H, C$_{1-4}$-alkyl, or NQ$^1$Q$^2$ is morpholinyl; and R$^1$, T & T$^1$ are H.

Although the compound of Formula (1) may be in the free acid form, that is a form in which each ionisable group, e.g. —COOH or —SO$_3$H, is in the free acid form as hereinbefore shown, it is preferably in the form of a salt with one or more cations selected from an alkali metal, ammonium and optionally substituted ammonium cation. Preferably the cation is ammonium or optionally substituted C$_{1-4}$-alkylammonium. A preferred cation consists of a nitrogen atom having four substituents selected from H, C$_{1-4}$-alkyl and hydroxy-C$_{1-4}$-alkyl, for example mono-, di-, tri- and tetra-(C$_{1-4}$-alkyl)-ammonium and mono-, di-, tri- and tetra-(hydroxy-C$_{1-4}$-alkyl)ammonium. It is especially preferred that the compound of Formula (1), (2) or (3) is a salt with an ammonium (i.e. NH$_4^+$), or a mono- or poly-, methyl-, ethyl- or hydroxyethyl-ammonium cation or with a mixture of two or more cations, especially a mixture of alkali metal, (such as sodium) and optionally substituted ammonium cations. Examples of optionally substituted C$_{1-4}$-alkylammonium cations include mono-, di-, tri- and tetramethylammonium, mono-, di-, tri- and tetraethylammonium, and mono-, di-, tri- and tetra-(2-hydroxyethyl)-ammonium.

The present compounds can be prepared by diazotising an amine of formula VS—A—NH$_2$, in which VS— is a vinylsulphone group (or a precursor thereof) preferably below 5° C. using a nitrite and mineral acid, coupling with a substituted aminonaphthalene carrying groups R$^2$; R$^3$ and Z$^2$ or with a substituted aniline carrying groups Z$^1$, Z$^2$ and Z$^5$ to give a monoazo compound, diazotising the monoazo compound and coupling with a compound of Formula (2):

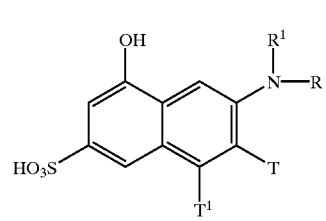

Formula (2)

and converting the vinylsulphone group (or precursor thereof) on A into a group J—CH$_2$CH$_2$SO$_2$—by reaction with an amine or alcohol of formula J—H.

The present compounds may also be prepared by converting the vinyl sulphone group (or precursor thereof) on A into a group of formula J—CH$_2$CH$_2$SO$_2$ by reaction with an amine or alcohol of formula J—H after the first disazotisation and coupling with the compound of Formula (2).

Compounds of Formula (2) in which R is other than H may be prepared using the Bucherer reaction in which 1-hydroxy-3-sulpho-7-hydroxy-naphthalene or 1-hydroxy-3,6-disulpho-7-hydroxynaphthalene is reacted with an amine, R$^1$—NH—R, in the presence of an alkali metal or ammonium sulphite and bisulphite (e.g. Na$_2$SO$_3$ and NaHSO$_3$) with heating, preferably from 60–100° C. and especially 70–90° C. Where R$^1$ is acyl in the compound of Formula (1), the amine R$^1$—NH—R may be replaced by an amine, H$_2$N—R, and the acyl group incorporated subsequently by acylation of the secondary amino group, —NH—R. In the above processes J, A, R, R$^1$, R$^2$, R$^{3,}$ Z$^1$, Z$^2$, Z$^5$, T and T$^1$ are as hereinbefore defined.

The present invention relates not only to a compound of Formula (1) but also to a composition comprising two or more such compounds. An example of such a composition is a mixture containing two compounds of Formula (1) in which Y is of Formula (1b) in one of which $R^3$ is H and $R^2$ is —COOH or —$SO_3H$ and in the other $R^3$ is —COOH or —$SO_3H$ and $R^2$ is H. It is preferred that such a composition contains two compounds of Formula (1) in a weight-to-weight ratio of 99:1 to 1:99, more preferably 90:10 to 10:90, especially 80:20 to 20:80, more especially 60:40 to 40:60.

The compound or composition of the present invention is conveniently synthesised in the form of an alkali metal, e.g. sodium, salt. This may be converted wholly or partially into its ammonium or optionally substituted $C_{1-4}$-alkylammonium salt by dissolving in water the compound in the form of a salt with an alkali metal, acidifying the solution with a mineral acid, e.g. hydrochloric acid, separating of the precipitated compound in free acid form, suspending it in water, adjusting the suspension to pH 9–9.5 with ammonia or an optionally substituted $C_{1-4}$-alkylamine to form the water soluble ammonium or substituted ammonium salt, and removing alkali metal chloride ions by dialysis. Alternatively the alkali metal ion may be partially or wholly exchanged for an optionally substituted ammonium ion by a conventional ion exchange method.

It will be understood that the present invention covers all tautomeric forms of a compound of Formula (1), for example the tautomeric equivalent of Formula (1) in which the hydroxy group on the naphthalene ring is in the keto form.

A compound or composition of the present invention, especially in the form of its ammonium or optionally substituted $C_{1-4}$-alkylammonium salt, is useful as a black colorant for the preparation of inks. In the form of a salt with an alkali metal or ammonium ions it has good solubility in water and aqueous media and good water fastness and is capable of giving a strong black print with high-water-fastness on plain paper. The ammonium salt form of the dye is especially preferred because it gives prints of especially high water-fastness.

Compounds of Formula (1) in which Y is of Formula (1a) wherein $R^3$ is H and $R^2$ is H or —$SO_3H$ and of Formula (1) in which Y is of Formula (1b) wherein $Z^1$ is $NH_2$ or $C_{1-4}$-alkoxy especially methoxy and $Z^2$ is alkoxy, especially methoxy, in the form of their ammonium or substituted ammonium salts, perform especially well as ink colorants.

The compound and composition are versatile, exhibiting high water fastness and rapid fixation on alkaline, neutral and acid papers, good solubility in aqueous ink media and good strong black prints with minimal bronzing.

According to a further feature of the present invention there is provided an ink comprising a compound or a composition according to the present invention and a liquid medium, preferably an aqueous medium. It is preferred that the compound or composition is completely dissolved in the liquid medium to form a solution.

The ink preferably contains from 0.5% to 20%, more preferably from 0.5% to 15%, and especially from 1% to 3%, by weight of the compound or composition, based on the total weight of the ink. Although many inks contain less than 5% by weight of colorant, it is desirable that the compound or composition has a water solubility of around 10% or more to allow the preparation of concentrates from which more dilute inks can be prepared and to minimise the chance of precipitation of colorant if evaporation of solvent occurs during use of the ink.

The liquid medium preferably comprises water or a mixture of water and one or more water-soluble organic solvents. The weight ratio of water to organic solvent(s) is preferably from 99:1 to 1:99, more preferably from 99:1 to 50:50 and especially from 95:5 to 80:20. The water-soluble organic solvent(s) is preferably selected from $C_{1-4}$-alkanols such as methanol, ethanol, n-propanol, isopropanol, n-butanol, sec-butanol, tert-butanol or isobutanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a $C_{2-6}$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkylethers of polyhydric alcohols such as 2-methoxy-ethanol, 2-(2-methoxyethoxy)ethanol, 2-(2-ethoxyethoxy)ethanol, 2-[2-(2-methoxy-ethoxy)ethoxy]ethanol, 2-[2-(2-ethoxyethoxy) ethoxy]ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-2-pyrrolidone; $C_{2-6}$-alkylene- and oligo-($C_{2-6}$-alkylene)glycols, such as ethyleneglycol, diethyleneglycol, triethyleneglycol; and $C_{1-4}$-alkyl ethers of polyhydric alcohols and glycols such as 2-methoxy-2-ethoxy-2-ethoxyethanol; and poly-($C_{2-4}$-alkyleneglycol)s with a molecular weight of up to 500. A preferred specific solvent mixture is a binary or ternary mixture of water and diethylene glycol and/or, 2-pyrrolidone or N-methyl-2-pyrrolidone in weight ratios 75–95:25-5 and 60-80:0-20:0-20 respectively.

Examples of suitable ink media are given in U.S. Pat. Nos. 4,963,189, 4,703,113, 4,626,284 and EP 4,251,50A.

A further aspect of the present invention provides a process for printing a substrate with an ink using an ink jet printer, characterised in that the ink contains at least one compound according to Formula (1) as hereinbefore described.

A suitable process for the application of an ink as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

A preferred substrate is an overhead projector slide or a cellulosic substrate, especially cotton or paper, including plain and treated papers, which may have an acid, alkaline or neutral character.

The preferred ink used in the process is as hereinbefore described.

According to a still further aspect of the present invention there is provided a paper or an overhead projector slide printed with a compound according to the invention.

The invention is further illustrated by the following Examples in which all parts and percentages are by weight unless otherwise indicated.

EXAMPLE 1

Stage 1

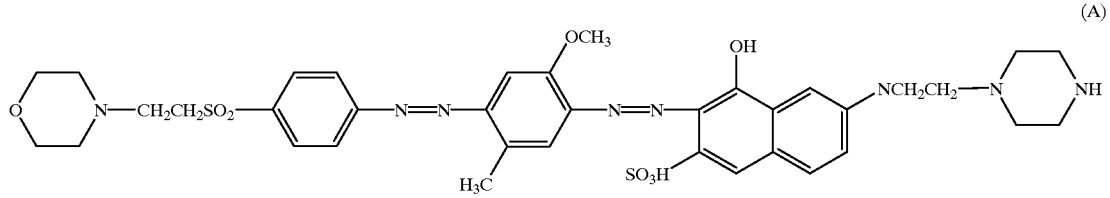

(A)

4-{4-(2-sulphatoethylsulphonyl)phenylazo}-2-methoxy-5-methylaniline

4-Aminobenzenesulphatoethylsulphone (53.4 g) was dissolved in water (500 cm$^3$) and sodium nitrite (15.2 g) was added and the resulting solution cooled to 0° C. before adding concentrated hydrochloric acid solution (50 cm$^3$) over 20 minutes keeping the temperature at 0° to 10° C.

After 2 hours residual HNO$_2$ was destroyed by addition of sulphamic acid. 2-Methoxy-5-methylaniline (27.4 g) was dissolved in 74 0P methylated spirits (250 cm$^3$) and cooled to 0° C. before adding the above diazo solution over 15 minutes at 0° C. to 5° C. The reaction mixture was stirred for 18 hours allowing the temperature to rise to 20° C. The precipitated product was filtered off, washed with water and dried at 70° C. to give the title compound (189.3 g).

Stage 2
4{-(4-(2-[4-morpholinyl]ethylsulphonyl)phenylazo }-2-methoxy-5-methylaniline The monoazo (85.8 g) from Stage 1 was added to water (800 cm$^3$) and morpholine (43.5 g) added. The reaction mixture was heated to 70° C. to 75° C. for 2 hours before cooling to 20° C. and decanting the liquor from the precipitating solid. The solid was dried at 70° C. to give the title compound (26.7 g).

Stage 3
N-(piperazinylethyl)-Gamma acid

A mixture of 1-(2-aminoethyl) piperazine (387 g), 1,7-dihydroxy-3-sulpho-naphthalene (285 g), NaHSO$_3$ (280 g) and water (1.25 l) was stirred and heated at 85–90° C. for 18 hours. The solution was filtered from a little insoluble material and the filtrate cooled to 10–20° C. Concentrated HCl was slowly added to adjust the pH to 2 and the reaction mixture then salted to 10% with NaCl. The mixture was stirred for 6 hours and the product filtered off, washed with 20% NaCl solution and dried at 60° C. (yield 215 g).

Stage 4

The product of Stage 2 (20.9 g) was dissolved in hydrochloric acid solution (200 cm$^3$ of 2 moldm$^{-3}$) and cooled to 0° C. before adding over 15 minutes at 0° C. to 5° C. solution of sodium nitrite (4.1 g) in water (40 cm$^3$).

The product of Stage 3 (17.5 g) in water (250 cm$^3$) was adjusted to pH9 and cooled to 0° C. before adding the above diazo compound over 15 minutes at pH9–10 at 0° C. to 5° C. The reaction mixture was stirred for 18 hours allowing the temperature to rise to 20° C. before filtering off the precipitated product. The product was converted to the ammonium salt by dissolving in concentrated ammonia and dialysed until chloride ions was no longer detected. The product was dried at 70° C. to give the compound of the above structure (14.9 g).

EXAMPLE 2

Preparation of

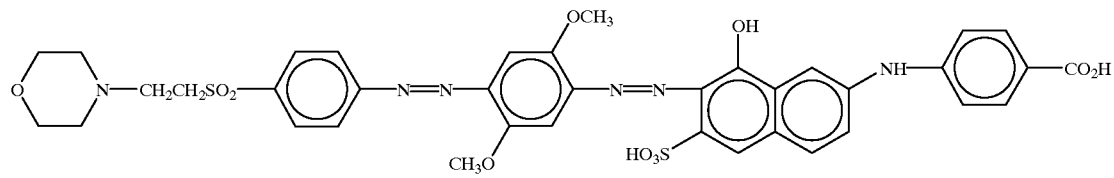

Stage 1

Sodium nitrite (38 g, 0.55 mol) was added to stirred suspension of 4-(β-sulphatoethylsulphonyl aniline ("Component A", 140.5 g, 0.5 mol) in water (1.5 L), at pH 6.5–7.0. This mixture was cooled to below 5° C. and concentrated HCl (125 ml) was added dropwise, maintaining temperature at 0–5C. The resulting cloudy yellow mixture was left to stir, at 0–10° C., pH ~2, for a further 3 hrs. Excess nitrous acid was then destroyed by the addition of sulfamic acid to give a diazo suspension. 2,5-Dimethoxyaniline ("Component B", 76.5 g, 0.5 mol) was dissolved in methylated spirits (750 ml) and cooled to <5° C. To this stirred solution the above diazo suspension was added in a slow stream, at 0–10° C. A red mixture was obtained. This was further stirred at 0–10° C. for 2 hrs before allowing the mixture to warm to room temperature and leaving it stirring over night. The next morning stirring was stopped and the mixture was left to settle for half an hour before filtering. The filtrate was washed with saturated brine solution (500 ml) and then left to dry in the vacuum oven (60° C.) until constant weight. The solid was then ground to give a monoazo compound in powdered form (187.5 g, 0.42 mol).

Stage 2

A solution of morpholine ("Component C", 35 g, 0.4 mol) in water (400ml) was heated to 60° C. To this stirred solution the product of stage 1 (90 g, 0.2 mol) was added portionwise. The pH fell from ~10.0 to ~8.0 during the addition. The pH was raised to ~10 using 2M NaOH solution and the mixture was left to stir at 60–65° C. After ~15 minutes the mixture became viscous. After stirring at this temperature for 1 hr the mixture was allowed to cool overnight. The following morning a solid was observed in the bottom of the beaker. The liquours were decanted-off and the solid was dissolved in hot acetone and screened to remove insoluble matter. The acetone was removed from the filtrate under vacuum to leave a sticky residue. This was slurried with methanol and then the methanol was also removed. The methanol slurrying was repeated until the solid was no longer sticky. The solid was than scraped out of the flask using diethyl ether and dried on a buchner funnel to give 63.24 g (0.1 mol) of a solid.

Stage 3

To a stirred suspension of the product from stage 2 (30 g, 0.07 mol) in water (600 ml), conc HCl (25 ml) was added dropwise to give a red solution. This was cooled to 5° C. and a solution of sodium nitrite (5.3 g, 0.08 mol) in water (50 ml) was added slowly, maintaining the temperature at 5–10° C. The mixture was left to stir at this temperature for a further 3 hrs before destroying excess nitrous acid by the addition of sulfamic acid to give solution 1. 1-Hydroxy-7-(4-carboxy phenylamino)-3-sulpho naphthalene ("Component D", 69 g, 0.07mol) was dissolved in water (500 ml) at pH 9.5. To this solution, Solution 1 was added slowly, maintaining the temperature at 5–10° C. (with the occasional addition of ice to do so), and pH 9–9.5. A black mixture was obtained. It was further stirred at 5–10° C. for 2 hours before allowing to warm to room temperature and leaving to stir over night.

The pH was lowered to ~6 to obtain a nice precipitate. This was filtered-off and dried on a buchner funnel to give a damp "cake". The solid cake was dissolved in water/ammonia (pH 10). This solution was then heated to 60° C. and ammonium chloride (10% w/v) was added. The resultant solid was filtered and dried on a buchner funnel until only slightly damp. It was then redissolved in water/ammonia and precipitated by pouring it into a stirring 4M HCl solution (1:1). The resultant solid was filtered-off and dried until only slightly damp. The process of making the ammonium salt above was repeated. The solid was finally taken and redissolved in ammonia/water and dialysed to remove chloride ions. The resultant solution was filtered through GF/F paper and dried in an oven at 60° C. The title product was obtained in a yield of 27.6 g (0.03 mol).

EXAMPLES 3 to 31

The general method of Example 2 was repeated except that in place of components A, B, C and D there was used the component listed in Table A. Where no component is specified in Table A, the component used was exactly the same as in Example 2.

TABLE A

| Example | Component A | Component B | Component C | Component D |
|---|---|---|---|---|
| 3 | | 1-amino naphthalene | diethanolamine | |
| 4 | | | N,N-dimethyl diaminoethane | |
| 5 | | | | 1-hydroxy-7-amino-3-sulpho naphthalene |
| 6 | | | | 1-hydroxy-7-(2-[piperazin-1-yl]ethylamino)-3-sulphonaphthalene |
| 7 | | 2-methoxy-5-methyl aniline | | 1-hydroxy-7-(2-[piperazin-1-yl]ethylamino)-3-sulphonaphthalene |
| 8 | | 2-methoxy-5-methyl aniline | | 1-hydroxy-7-amino-3-sulpho naphthalene |
| 9 | | 2-methoxy-5-methyl aniline | | |
| 10 | | 1-amino-7-sulpho naphthalene | | 1-hydroxy-7-(2-[piperazin-1-yl]ethylamino)-3-sulpho naphthalene |
| 11 | | | | 1-hydroxy-7-(2-[1-morpholinyl]ethylamino)-3-sulpho naphthalene |
| 12 | | | dimethylamine | |
| 13 | | 2-methoxy-5-methyl aniline | | 1-hydroxy-7-(2-[1-morpholinyl]ethylamino)-3- |

TABLE A-continued

| Example | Component A | Component B | Component C | Component D |
|---|---|---|---|---|
| 14 | | | diisopropylamine | sulpho naphthalene 1-hydroxy-7-(2-[1-morpholinyl] ethylamino)-3-sulpho naphthalene |
| 15 | | | diisopropylamine | 1-hydroxy-7-N,N-dimethylamino ethylamino-3-sulpho naphthalene |
| 16 | | | Proline | |
| 17 | | | Proline | 1-hydroxy-7-amino-3-sulpho naphthalene |
| 18 | | | 4-carboxy piperidine | 1-hydroxy-7-amino-3-sulpho naphthalene |
| 19 | | | 4-carboxy piperidine | |
| 20 | 3-(β-sulphato ethylsulphonyl)-6-methoxy aniline | 1-amino naphthalene | Proline | |
| 21 | 3-(β-sulphato ethylsulphonyl)-6-methoxy aniline | 1-amino naphthalene | Proline | 1-hydroxy-7-amino-3-sulpho naphthaline |
| 22 | | 1-amino naphthalene | Proline | |
| 23 | | 1-amino naphthalene | Proline | 1-hydroxy-7-amino-3-sulpho naphthalene |
| 24 | | | Proline | 1-hydroxy-7-(2-[piperazin-1-yl] ethylamino)-3-sulpho naphthalene |
| 25 | | | Proline | 1-hydroxy-7-(2-[1-morpholinyl] ethylamino)-3-sulpho naphthalene |
| 26 | | 2-methoxy-5-methyl aniline | Proline | 1-hydroxy-7-amino-3-sulpho naphthalene |
| 27 | | 2-methoxy-5-methyl aniline | Proline | |
| 28 | | | Proline | 1-hydroxy-7-N,N-dimethylamino ethylamino-5-sulpho naphthalene |
| 29 | | | 4-methylamino-N-methyl piperidine | 1-hydroxy-7-amino-3-sulpho naphthalene |
| 30 | | | 4-methylamino-N-methyl piperidine | |
| 31 | | | bis(2-ethylhexyl) amine | |

By way of illustration the structures of a selection of dyes derived from the above examples are shown on the following sheets. These structures show the skeleton of the dyes and hydrogen atoms are not shown.

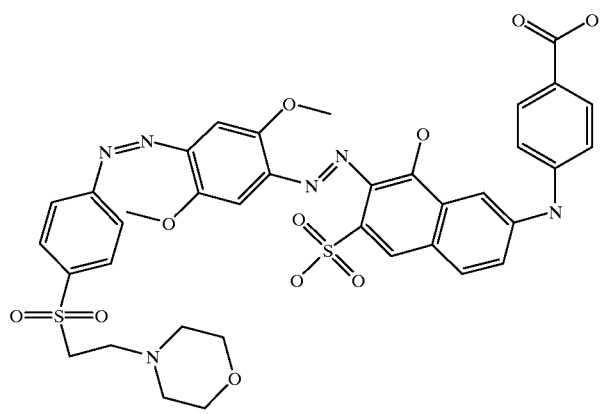
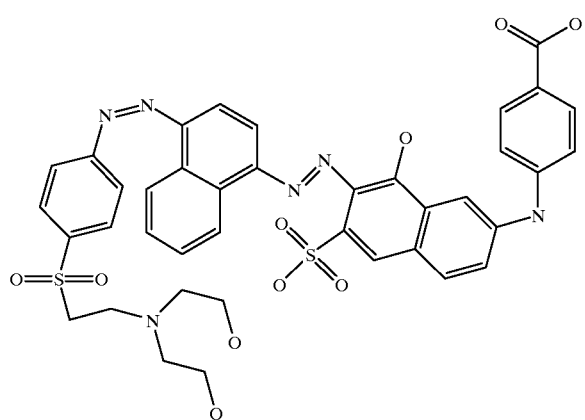
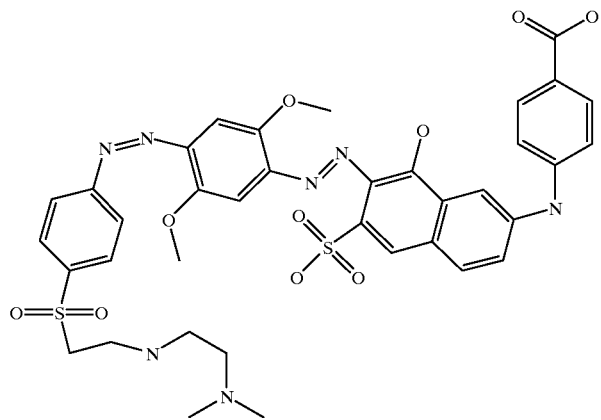
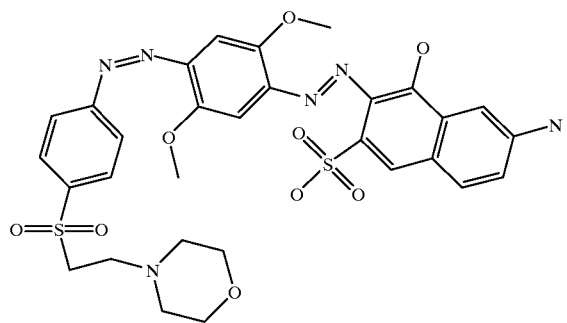

-continued
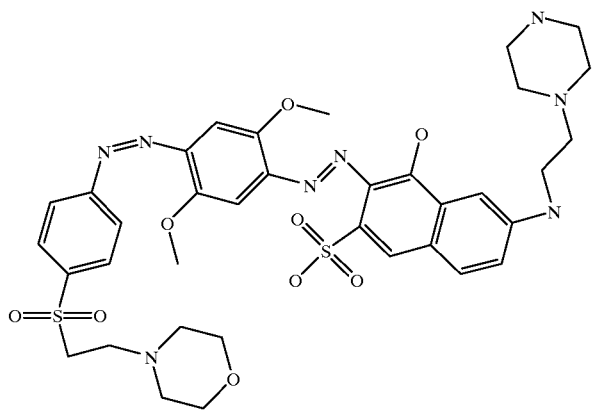
6
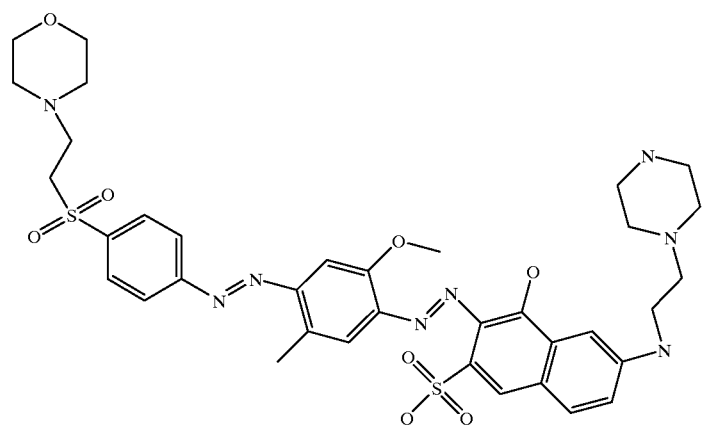
7
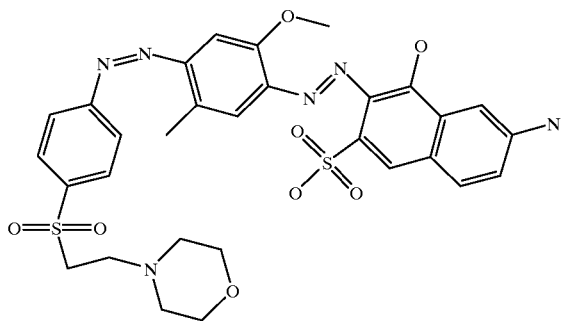
8
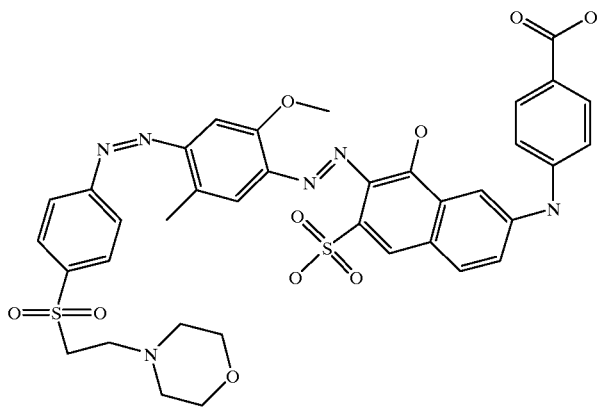
9

10
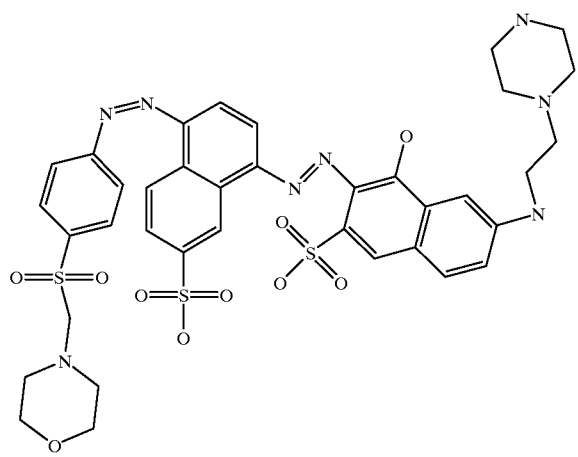
11
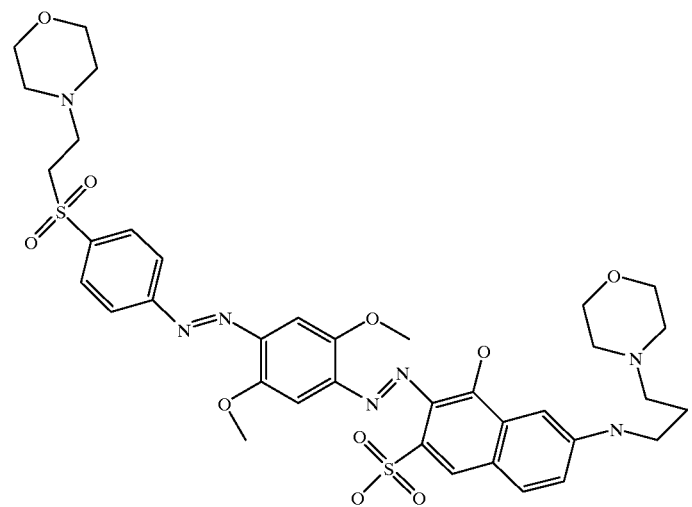
12
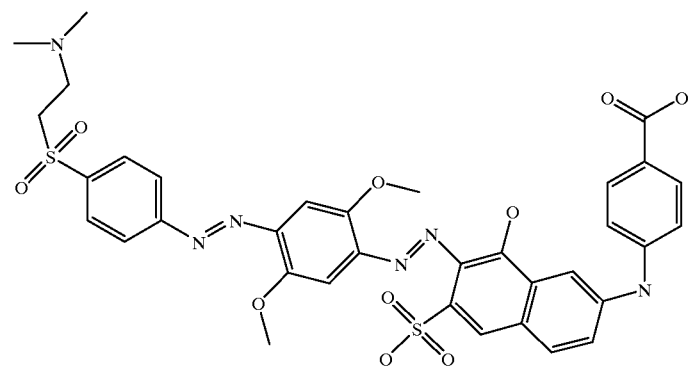

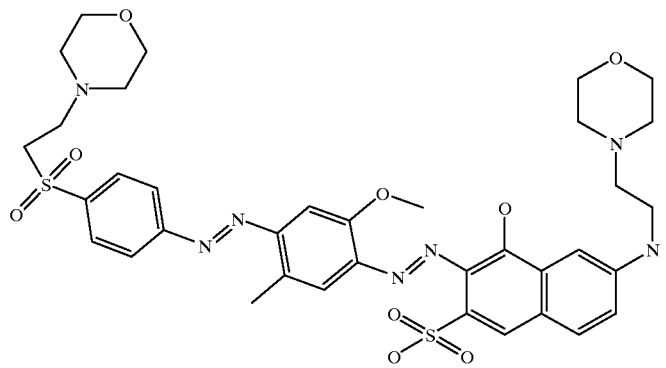
13
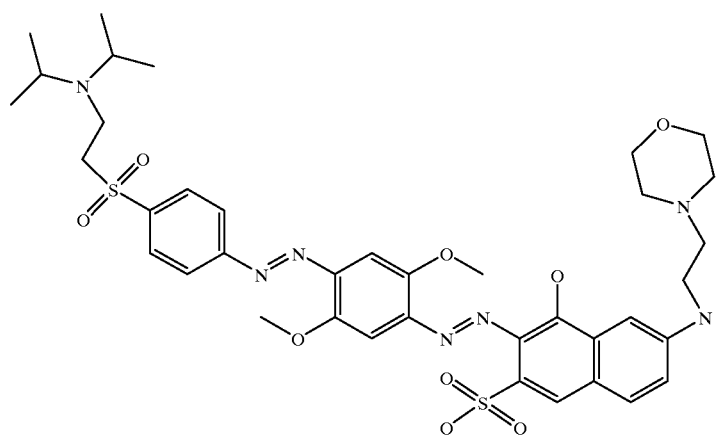
14
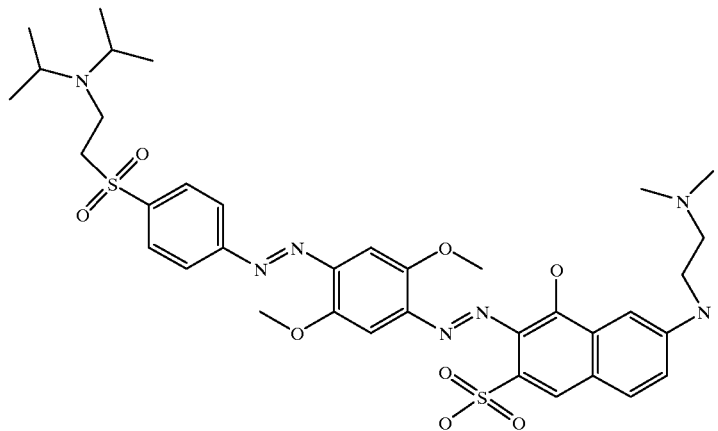
15

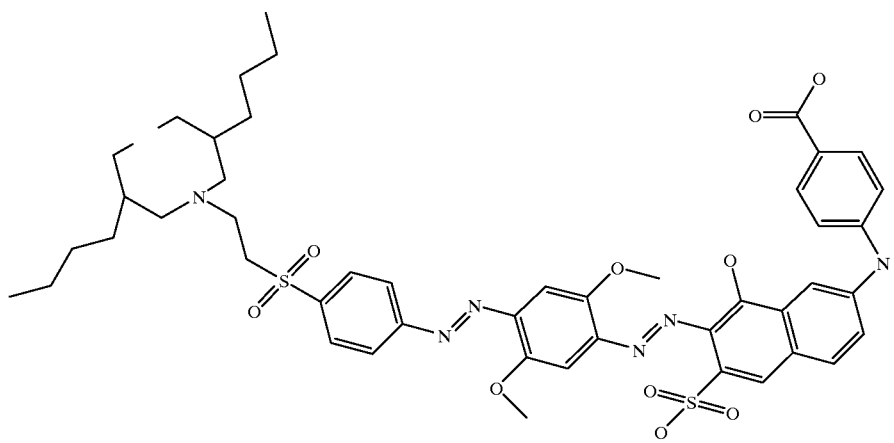

Inks

The inks described in Tables I and II may be prepared wherein the Dye described in the first column is the Dye made in the above example of the same number. Numbers quoted in the second column onwards refer to the number of parts of the relevant ingredient and all parts are by weight. The inks may be applied to paper by thermal or piezo ink jet printing.

The following abbreviations are used in Table I and II:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=Na$_2$HPO$_4$ and
TBT=tertiary butanol
TDG=thiodiglycol

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | | 7 | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |

TABLE II-continued

| Dye | Dye Content | Water | PG | DEG | NMP | CET | TBT | TDG | BDL | PHO | 2P | PI2 |
|---|---|---|---|---|---|---|---|---|---|---|---|---|
| 24 | 2.5 | 90 |   | 6 | 4 |   |   |   |   | 0.12 |   |   |
| 25 | 3.1 | 82 | 4 | 8 |   | 0.3 |   |   |   |   |   | 6 |
| 26 | 0.9 | 85 |   | 10 |   |   |   |   | 5 | 0.2 |   |   |
| 27 | 8.0 | 90 |   | 5 | 5 |   |   | 0.3 |   |   |   |   |
| 28 | 4.0 | 70 |   | 10 | 4 |   |   |   | 1 |   | 4 | 11 |
| 29 | 2.2 | 75 | 4 | 10 | 3 |   |   |   | 2 |   | 6 |   |
| 30 | 10.0 | 91 |   |   | 6 |   |   |   |   |   | 3 |   |
| 31 | 9.0 | 76 |   | 9 | 7 |   | 3.0 |   |   | 0.95 | 5 |   |
| 32 | 5.0 | 78 | 5 | 11 |   |   |   |   |   |   | 6 |   |
| 33 | 5.4 | 86 |   |   | 7 |   |   |   |   |   | 7 |   |
| 24 | 2.1 | 70 | 5 | 5 | 5 | 0.1 | 0.2 | 0.1 | 5 | 0.1 | 5 |   |
| 15 | 2.0 | 90 |   | 10 |   |   |   |   |   |   |   |   |
| 1 | 2 | 88 |   |   |   |   |   | 10 |   |   |   |   |
| 2 | 5 | 78 |   |   | 5 |   |   | 12 |   |   | 5 |   |
| 1 | 8 | 70 | 2 |   | 8 |   |   | 15 |   |   | 5 |   |
| 1 | 10 | 80 |   |   |   |   |   | 8 |   |   | 12 |   |
| 1 | 10 | 80 |   | 10 |   |   |   |   |   |   |   |   |

We claim:

1. A compound of Formula (1) or a salts thereof:

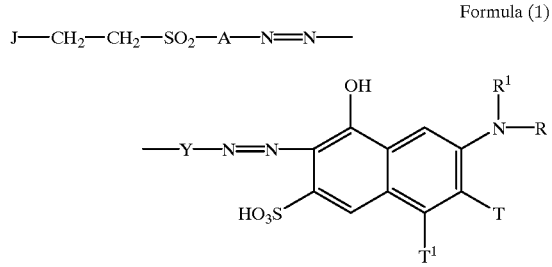

Formula (1)

wherein:

J is —NR$^4$R$^5$;

R$^4$ is H or optionally substituted alkyl, aryl or acyl; and

R$^5$ H or optionally substituted alkyl; or

R$^4$ & R$^5$ taken together with the N atom to which they are attached form a 5- or 6-membered carbocyclic group optionally containing a ring oxygen atom;

A is optionally substituted phenylene or optionally substituted naphthylene;

Y is naphthylene of Formula (1a) or phenylene of Formula (1b)

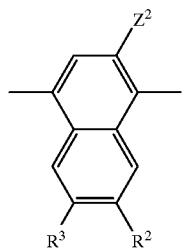

Formula (1a)

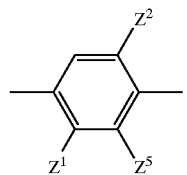

Formula (1b)

wherein

R$^2$ & R$^3$ each independently is H, —COOH or —SO$_3$H;

Z$^1$ & Z$^5$ each independently is H, optionally substituted alkyl, optionally substituted alkoxy or —NZ$^3$Z$^4$;

Z$^2$ is H, halo, —COOH, SO$_3$H, optionally substituted alkyl, optionally substituted alkoxy, or optionally substituted alkylthio;

Z$^3$ is H or optionally substituted alkyl; and

Z$^4$ is H, optionally substituted alkyl or acyl.

R$^1$ is H or optionally substituted alkyl, alkylcarbonyl, alkylsulphonyl, alkoxycarbonyl, alkoxysulphonyl, arylcarbonyl or arylsulphonyl;

T & T$^1$ each independently is H or SO$_3$H;

R is H or optionally substituted alkyl or aryl, or a group —B—NQ$^1$Q$^2$;

B is optionally substituted C$_{2-6}$-alkylene; and

Q$^1$ & Q$^2$ each independently is H, optionally substituted C$_{1-4}$-alkyl or Q$^1$ and Q$^2$ together with the N atom to which they are attached form an optionally substituted 5- or 6-membered carbocyclic group optionally containing a ring oxygen atom.

2. A compound according to claim 1 or claim 2 wherein J is not a pyrazolinyl group.

3. A compound of Formula (1) or a salt thereof:

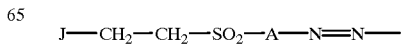

Formula (1)

-continued

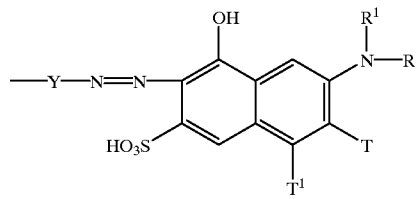

wherein:

J is R$^4$O—, R$^4$R$^5$N—, morpholinyl, pyrrolidinyl or piperidinyl;

R$^4$ is H, C$_{1-4}$-alkyl, C$_{1-4}$-hydroxyalkyl or phenyl;

R$^5$ is H, C$_{1-4}$-alkyl or C$_{1-4}$-hydroxyalkyl;

A is phen-1,4-ylene or phen-1,3-ylene;

Y is of Formula (1a) in which R$^3$ is H and R$^2$ is H or —SO$_2$OH; or

Y is of Formula (1b) in which Z$^1$ is C$_{1-4}$-alkyl, C$_{1-4}$-alkoxy or —NH$_2$ and Z$^2$ is H, C$_{1-4}$-alkyl or C$_{1-4}$-alkoxy;

Formula (1a)

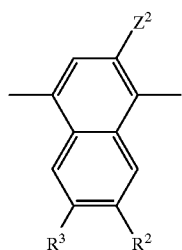

Formula (1b)

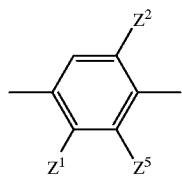

R is H, C$_{1-4}$-alkyl, phenyl, carboxyphenyl, dicarboxyphenyl or —B—NQ$^1$Q$^2$ in which B is —CH$_2$CH$_2$—, —CH$_2$CH$_2$(CH$_3$)—, or —CH$_2$CH$_2$CH$_2$—and Q$^1$ and Q$^2$ are each independently H, C$_{1-4}$-alkyl, or NQ$^1$Q$^2$ is morpholinyl; and R$^1$, T & T$^1$ are H.

4. A composition comprising two or more compounds of Formula (1), as defined in claim 1.

5. An ink comprising a liquid medium and a compound of Formula (1), as defined in claim 1.

6. An ink comprising a liquid medium and a composition comprising two or more compounds of Formula (1) or a salt thereof:

Formula (1)

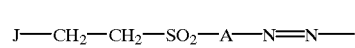

-continued

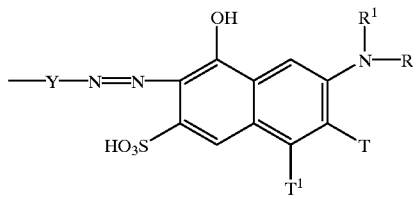

wherein:

J is —OR$^4$ or —NR$^4$R$^5$;

R$^4$ is H or optionally substituted alkyl, aryl or acyl; and

R$^5$ H or optionally substituted alkyl; or

R$^4$ & R$^5$ taken together with the N atom to which they are attached form a 5- or 6-membered carbocyclic group optionally containing a ring oxygen atom;

A is optionally substituted phenylene or optionally substituted naphthylene;

Y is naphthylene of Formula (1a) or phenylene of Formula (1b)

Formula (1a)

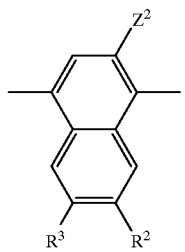

Formula (1b)

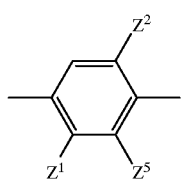

wherein

R$^2$ & R$^3$ each independently is H, —COOH or —SO$_3$H;

Z$^1$ & Z$^5$ each independently is H, optionally substituted alkyl, optionally substituted alkoxy or —NZ$^3$Z$^4$;

Z$^2$ is H, halo, —COOH, SO$_3$H optionally substituted alkyl, optionally substituted alkoxy, or optionally substituted alkylthio;

Z$^3$ is H or optionally substituted alkyl; and

Z$^4$ is H, optionally substituted alkyl or acyl.

R$^1$ is H or optionally substituted alkyl, alkylcarbonyl, alkylsulphonyl, alkoxycarbonyl, alkoxysulphonyl, arylcarbonyl or arylsulphonyl;

T & T$^1$ each independently is H or SO$_3$H;

R is H or optionally substituted alkyl or aryl, or a group —B—NQ$^1$Q$^2$;

B is optionally substituted C$_{2-6}$alkylene; and

Q$^1$ & Q$^2$ each independently is H, optionally substituted C$_{1-4}$-alkyl or Q$^4$ and Q$^2$ together with the N atom to which they are attached form an optionally substituted 5- or 6-membered carbocyclic group optionally containing a ring oxygen atom.

7. An ink according to claim 5 or 6 wherein the liquid medium comprises a mixture of water and one or more water-soluble organic solvents.

8. A process for printing a substrate with an ink using an ink jet printer which comprises directing ink from the jet printer onto a substrate wherein the ink contains at least one compound of Formula (1) or a salt thereof:

Formula (1)

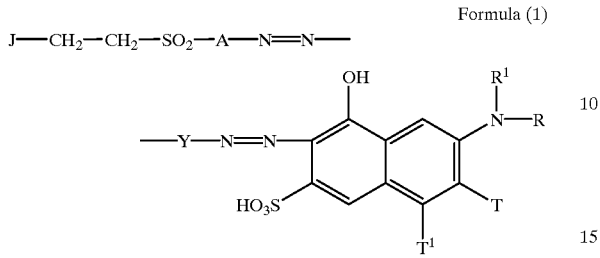

wherein:

J is —OR$^4$ or —NR$^4$R$^5$;

R$^4$ is H or optionally substituted alkyl, aryl or acyl; and

R$^5$ H or optionally substituted alkyl; or

R$^4$ & R$^5$ taken together with the N atom to which they are attached form a 5- or 6-membered carbocyclic group optionally containing a ring oxygen atom;

A is optionally substituted phenylene or optionally substituted naphthylene;

Y is naphthylene of Formula (1a) or phenylene of Formula (1b)

Formula (1a)

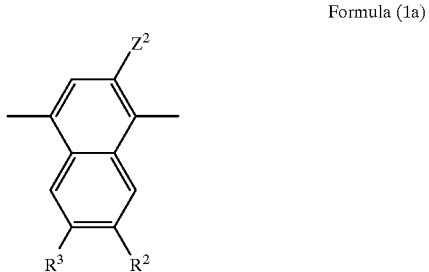

Formula (1b)

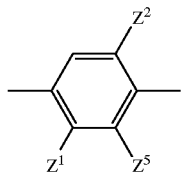

wherein

R$^2$ & R$^3$ each independently is H, —COOH or —SO$_3$H;

Z$^1$ & Z$^5$ each independently is H, optionally substituted alkyl, optionally substituted alkoxy or —NZ$^3$Z$^4$;

Z$^2$ is H, halo, —COOH, SO$_3$H, optionally substituted alkyl, optionally substituted alkoxy, or optionally substituted alkylthio;

Z$^3$ is H or optionally substituted alkyl; and

Z$^4$ is H, optionally substituted alkyl or acyl.

R$^1$ is H or optionally substituted alkyl, alkylcarbonyl, alkylsulphonyl, alkoxycarbonyl, alkoxysulphonyl, arylcarbonyl or arylsulphonyl;

T & T$^1$ each independently is H or SO$_3$H;

R is H or optionally substituted alkyl or aryl, or a group —B—NQ$^1$Q$^2$;

B is optionally substituted C$_{2-6}$-alkylene; and

Q$^1$ & Q$^2$ each independently is H, optionally substituted C$_{1-4}$-alkyl or Q$^1$ and Q$^2$ together with the N atom to which they are attached form an optionally substituted 5- or 6-membered carbocyclic group optionally containing a ring oxygen atom.

9. A process according to claim 8 wherein the substrate is paper.

10. A substrate printed with at least one compound according to claim 1.

* * * * *